(12) United States Patent
Amari

(10) Patent No.: US 12,291,995 B2
(45) Date of Patent: May 6, 2025

(54) HYBRID ELECTRIC SINGLE ENGINE DESCENT POWER EXTRACTION CONTROL

(71) Applicant: RTX Corporation, Farmington, CT (US)

(72) Inventor: Martin Richard Amari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 241 days.

(21) Appl. No.: 17/971,955

(22) Filed: Oct. 24, 2022

(65) Prior Publication Data

US 2023/0136062 A1      May 4, 2023

Related U.S. Application Data

(60) Provisional application No. 63/273,542, filed on Oct. 29, 2021.

(51) Int. Cl.
| | |
|---|---|
| *F02C 6/00* | (2006.01) |
| *B64D 27/10* | (2006.01) |
| *B64D 27/24* | (2006.01) |
| *B64D 31/12* | (2006.01) |
| *F02C 7/00* | (2006.01) |
| *F02C 9/42* | (2006.01) |

(Continued)

(52) U.S. Cl.
CPC ............... *F02C 6/00* (2013.01); *B64D 27/10* (2013.01); *B64D 27/24* (2013.01); *B64D 31/12* (2013.01); *F02C 7/00* (2013.01); *F02C 9/42* (2013.01); *G05D 1/101* (2013.01); *B64D 27/026* (2024.01)

(58) Field of Classification Search
CPC .... F02C 6/00; F02C 7/00; F02C 7/057; F02C 9/42; B64D 27/10; B64D 27/24; B64D 27/30; B64D 27/026; B64D 31/12; G05D 1/101; F05D 2220/76; F05D 2220/323
See application file for complete search history.

(56) References Cited

U.S. PATENT DOCUMENTS

| | | |
|---|---|---|
| 10,377,500 B2 | 8/2019 | Kobayashi et al. |
| 2018/0003072 A1 | 1/2018 | Lents et al. |
| (Continued) | | |

OTHER PUBLICATIONS

Extended European Search Report; Application No. 22204557.7-1004; Date Issued Mar. 14, 2023; 10 pages.

*Primary Examiner* — Loren C Edwards
(74) *Attorney, Agent, or Firm* — CANTOR COLBURN LLP

(57) ABSTRACT

A system of a hybrid aircraft includes a first gas turbine engine, a second gas turbine engine, and a controller. The first gas turbine engine includes a first low spool electric machine and a first high spool electric machine. The second gas turbine engine includes a second low spool electric machine and a second high spool electric machine. The controller is operable to determine an operating mode of the hybrid aircraft and control power extraction from either or both of the first low spool electric machine and the first high spool electric machine while a single engine descent mode is active. Electric power is provided to either or both of the second low spool electric machine and the second high spool electric machine while the single engine descent mode is active to balance thrust between the first gas turbine engine and the second gas turbine engine.

20 Claims, 4 Drawing Sheets

(51) Int. Cl.
    *G05D 1/00*         (2006.01)
    *B64D 27/02*      (2006.01)

(56) References Cited

U.S. PATENT DOCUMENTS

| | | |
|---|---|---|
| 2020/0056497 A1 | 2/2020 | Terwilliger et al. |
| 2020/0392903 A1 | 12/2020 | Turner |
| 2021/0017914 A1 | 1/2021 | Turner |
| 2021/0222629 A1* | 7/2021 | Terwilliger ............ B64D 27/24 |

* cited by examiner

400 ↘

402
Determine an operating mode of a hybrid aircraft that includes a first gas turbine engine and a second gas turbine engine, where the first gas turbine engine includes a first low spool electric machine and a first high spool electric machine, and the second gas turbine engine includes a second low spool electric machine and a second high spool electric machine

404
Control power extraction from either or both of the first low spool electric machine and the first high spool electric machine while a single engine descent mode is active

406
Provide electric power to either or both of the second low spool electric machine and the second high spool electric machine the single engine descent mode is active to balance thrust between the first gas turbine engine and the second gas turbine engine

FIG. 4

HYBRID ELECTRIC SINGLE ENGINE DESCENT POWER EXTRACTION CONTROL

CROSS-REFERENCE TO RELATED APPLICATIONS

This application claims the benefit of U.S. Provisional Application No. 63/273,542 filed Oct. 29, 2021, the disclosure of which is incorporated herein by reference in its entirety.

BACKGROUND

The subject matter disclosed herein generally relates to rotating machinery and, more particularly, to a method and an apparatus for hybrid electric single engine descent power extraction control.

In some modes of operation, fuel consumption of an aircraft with multiple engines can be reduced by only running one engine, such as during aircraft descent. However, operating an aircraft with a single engine producing thrust can create a yawing moment on the aircraft that may necessitate compensation actions. Further, the engine that is non-operational may need time to support starting prior to a mode transition of the aircraft or in the event that the fuel-burning engine shuts off unexpectedly.

BRIEF DESCRIPTION

According to one embodiment, a system of a hybrid aircraft includes a first gas turbine engine, a second gas turbine engine, and a controller. The first gas turbine engine includes a first low spool electric machine and a first high spool electric machine. The second gas turbine engine includes a second low spool electric machine and a second high spool electric machine. The controller is operable to determine an operating mode of the hybrid aircraft and control power extraction from either or both of the first low spool electric machine and the first high spool electric machine while a single engine descent mode is active. Electric power is provided to either or both of the second low spool electric machine and the second high spool electric machine while the single engine descent mode is active to balance thrust between the first gas turbine engine and the second gas turbine engine.

In addition to one or more of the features described above or below, or as an alternative, further embodiments may include where the first gas turbine engine combusts fuel, and fuel combustion is inhibited in the second gas turbine engine while the single engine descent mode is active.

In addition to one or more of the features described above or below, or as an alternative, further embodiments may include where the single engine descent mode is active based on determining that the first gas turbine engine has a thrust generation capacity to maintain a targeted airspeed during descent of the hybrid aircraft in combination with providing electric power to either or both of the second low spool electric machine and the second high spool electric machine.

In addition to one or more of the features described above or below, or as an alternative, further embodiments may include where the controller is configured to apply a higher weighting on extracting power from the first high spool electric machine than from the first low spool electric machine to balance power extraction with thrust or speed of the first gas turbine engine.

In addition to one or more of the features described above or below, or as an alternative, further embodiments may include where the controller is configured to apply a higher weighting on extracting power from the first low spool electric machine to lower a thrust output of the first gas turbine engine.

In addition to one or more of the features described above or below, or as an alternative, further embodiments may include an energy storage system, where the controller is operable to provide at least a portion of the power extracted from either or both of the first low spool electric machine and the first high spool electric machine to the energy storage system.

In addition to one or more of the features described above or below, or as an alternative, further embodiments may include where the controller is operable to power either or both of the second low spool electric machine and the second high spool electric machine at least in part by one or more of the energy storage system and a power source external to the second gas turbine engine.

In addition to one or more of the features described above or below, or as an alternative, further embodiments may include where the controller is configured to apply a higher power input weighting to the second high spool electric machine than to the second low spool electric machine to maintain relight readiness of the second gas turbine engine.

In addition to one or more of the features described above or below, or as an alternative, further embodiments may include where one or more accessories of the first gas turbine engine and one or more accessories of the second gas turbine engine are powered while the single engine descent mode is active.

In addition to one or more of the features described above or below, or as an alternative, further embodiments may include where the controller is operable to change a designation of the first gas turbine engine and the second gas turbine engine between flights of the hybrid aircraft.

According to an embodiment, a method includes determining an operating mode of a hybrid aircraft including a first gas turbine engine and a second gas turbine engine, where the first gas turbine engine includes a first low spool electric machine and a first high spool electric machine, and the second gas turbine engine includes a second low spool electric machine and a second high spool electric machine. Power extraction is controlled from either or both of the first low spool electric machine and the first high spool electric machine while a single engine descent mode is active. Electric power is provided to either or both of the second low spool electric machine and the second high spool electric machine while the single engine descent mode is active to balance thrust between the first gas turbine engine and the second gas turbine engine.

In addition to one or more of the features described above or below, or as an alternative, further embodiments may include combusting fuel by the first gas turbine engine and inhibiting fuel combustion in the second gas turbine engine while the single engine descent mode is active.

In addition to one or more of the features described above or below, or as an alternative, further embodiments may include applying a higher weighting on extracting power from the first high spool electric machine than from the first low spool electric machine to balance power extraction with thrust or speed of the first gas turbine engine.

In addition to one or more of the features described above or below, or as an alternative, further embodiments may include applying a higher weighting on extracting power from the first low spool electric machine to lower a thrust output of the first gas turbine engine.

In addition to one or more of the features described above or below, or as an alternative, further embodiments may include providing at least a portion of the power extracted from either or both of the first low spool electric machine and the first high spool electric machine to an energy storage system.

In addition to one or more of the features described above or below, or as an alternative, further embodiments may include powering either or both of the second low spool electric machine and the second high spool electric machine at least in part by one or more of the energy storage system and a power source external to the second gas turbine engine.

In addition to one or more of the features described above or below, or as an alternative, further embodiments may include applying a higher power input weighting to the second high spool electric machine than to the second low spool electric machine to maintain relight readiness of the second gas turbine engine.

In addition to one or more of the features described above or below, or as an alternative, further embodiments may include powering one or more accessories of the first gas turbine engine and one or more accessories of the second gas turbine engine while the single engine descent mode is active.

In addition to one or more of the features described above or below, or as an alternative, further embodiments may include changing a designation of the first gas turbine engine and the second gas turbine engine between flights of the hybrid aircraft.

A technical effect of the apparatus, systems and methods is achieved by performing hybrid electric single engine descent power extraction control.

BRIEF DESCRIPTION OF THE DRAWINGS

The following descriptions should not be considered limiting in any way. With reference to the accompanying drawings, like elements are numbered alike:

FIG. 4 is a flow chart illustrating a method, in accordance with an embodiment of the disclosure.

DETAILED DESCRIPTION

A detailed description of one or more embodiments of the disclosed apparatus and method are presented herein by way of exemplification and not limitation with reference to the Figures.

Figure 1:
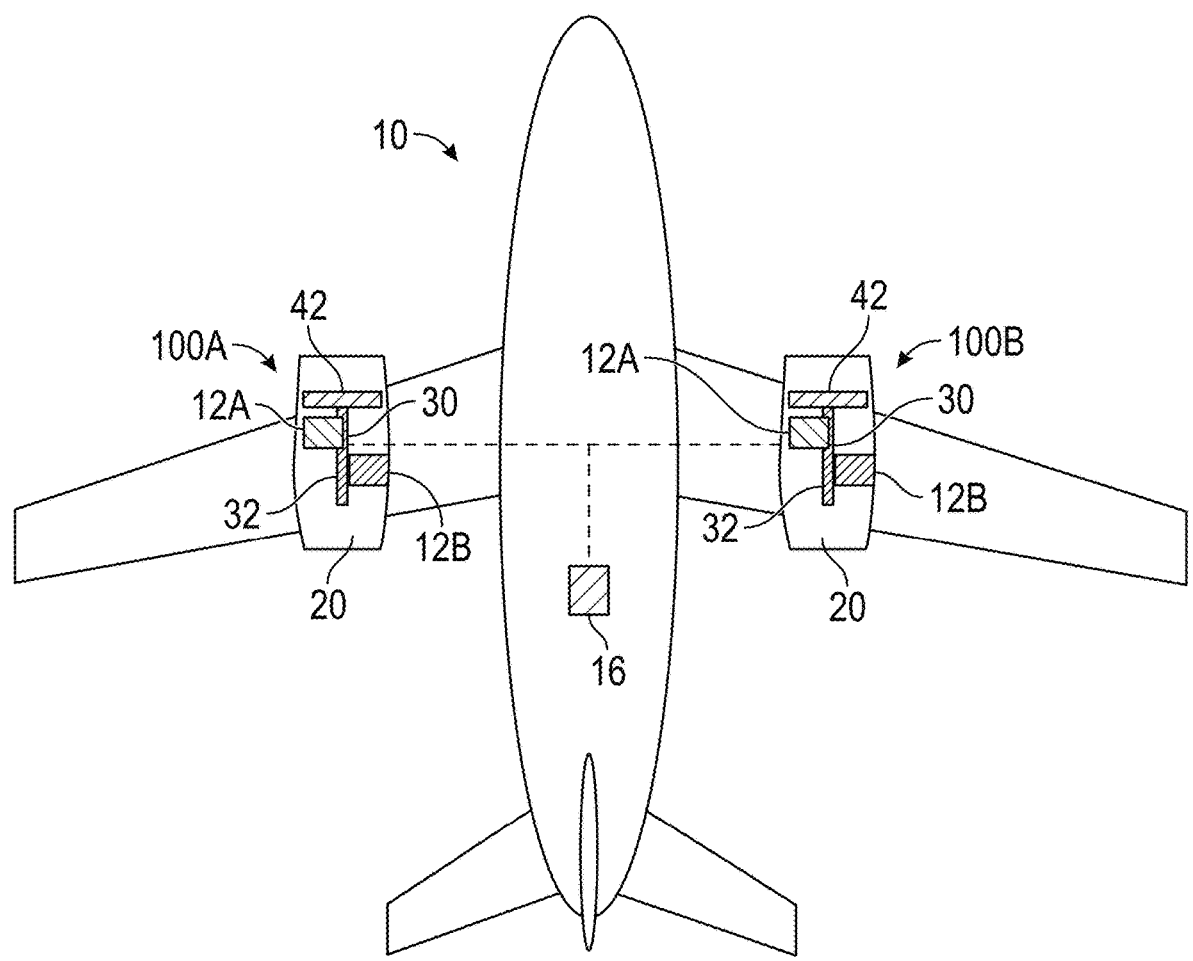
FIG. 1 is a schematic diagram of a hybrid aircraft, in accordance with an embodiment of the disclosure.

FIG. 1 schematically illustrates a hybrid aircraft 10 that includes a pair of hybrid electric propulsion systems 100A, 100B (also referred to as hybrid gas turbine engines 100A, 100B or hybrid propulsion systems 100A, 100B). Each of the hybrid electric propulsion systems 100A, 100B includes a gas turbine engine 20 (e.g., a first gas turbine engine 20A and a second gas turbine engine 20B) with a low speed spool 30 configured to drive rotation of a fan 42. Each gas turbine engine 20A, 20B also includes a high speed spool 32 that operates at higher speeds and pressures than the low speed spool 30. A low spool electric machine 12A can be configured to augment rotational power of the corresponding gas turbine engine 20A, 20B, for instance, by driving rotation of the low speed spool 30 and fan 42 in a motor mode. The low spool electric machine 12A can be configured to extract power from the low speed spool 30 and output electrical power in a generator mode. In some embodiments, one or more of the gas turbine engines 20A, 20B can include a high spool electric machine 12B configured to drive the high speed spool 32 in a motor mode. The high spool electric machine 12B can be configured to extract rotational power from the high speed spool 32 of the corresponding gas turbine engine 20A, 20B and produce electric power. At least one power source 16 of the hybrid aircraft 10 can provide at least a portion of electrical power to the electric machines 12A, 12B of the gas turbine engines 20A, 20B and/or other components of the hybrid aircraft 10. The power source 16 can be a stored energy source or a generator driven by an engine. For example, the power source 16 can include one or more of a battery, a supercapacitor, an ultracapacitor, a fuel cell, a flywheel, and the like. Where the hybrid aircraft 10 includes an additional thermal engine (not depicted), such as an auxiliary power unit or a supplemental power unit, the power source 16 can be a generator driven by the thermal engine.

Further, electric machines 12A, 12B of one of the hybrid electric propulsion systems 100A, 100B can provide power to the other hybrid electric propulsion systems 100A, 100B and/or power to the power source 16. For example, if the hybrid electric propulsion system 100A is combusting fuel, the hybrid electric propulsion system 100B may operate without burning fuel and can drive the low speed spool 30 and fan 42 based on either or both of the electric machines 12A, 12B of the hybrid electric propulsion system 100B receiving electric power from either or both of the electric machines 12A, 12B of the hybrid electric propulsion system 100A and/or the power source 16. Further, if the hybrid electric propulsion system 100B is combusting fuel, the low speed spool 30 of the hybrid electric propulsion system 100A can be driven based on either or both of the electric machines 12A, 12B of the hybrid electric propulsion system 100A receiving electric power from either or both of the electric machines 12A, 12B of the hybrid electric propulsion system 100B and/or the power source 16.

While the example of FIG. 1 illustrates a simplified example of the gas turbine engines 20A, 20B, it will be understood that any number of spools, and inclusion or omission of other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications. Further, each of the electric machines 12A, 12B can be separated and implemented as a separate electric motor and a generator rather than switching each of the electric machines 12A, 12B between a motor mode and a generator mode.

Figure 2:
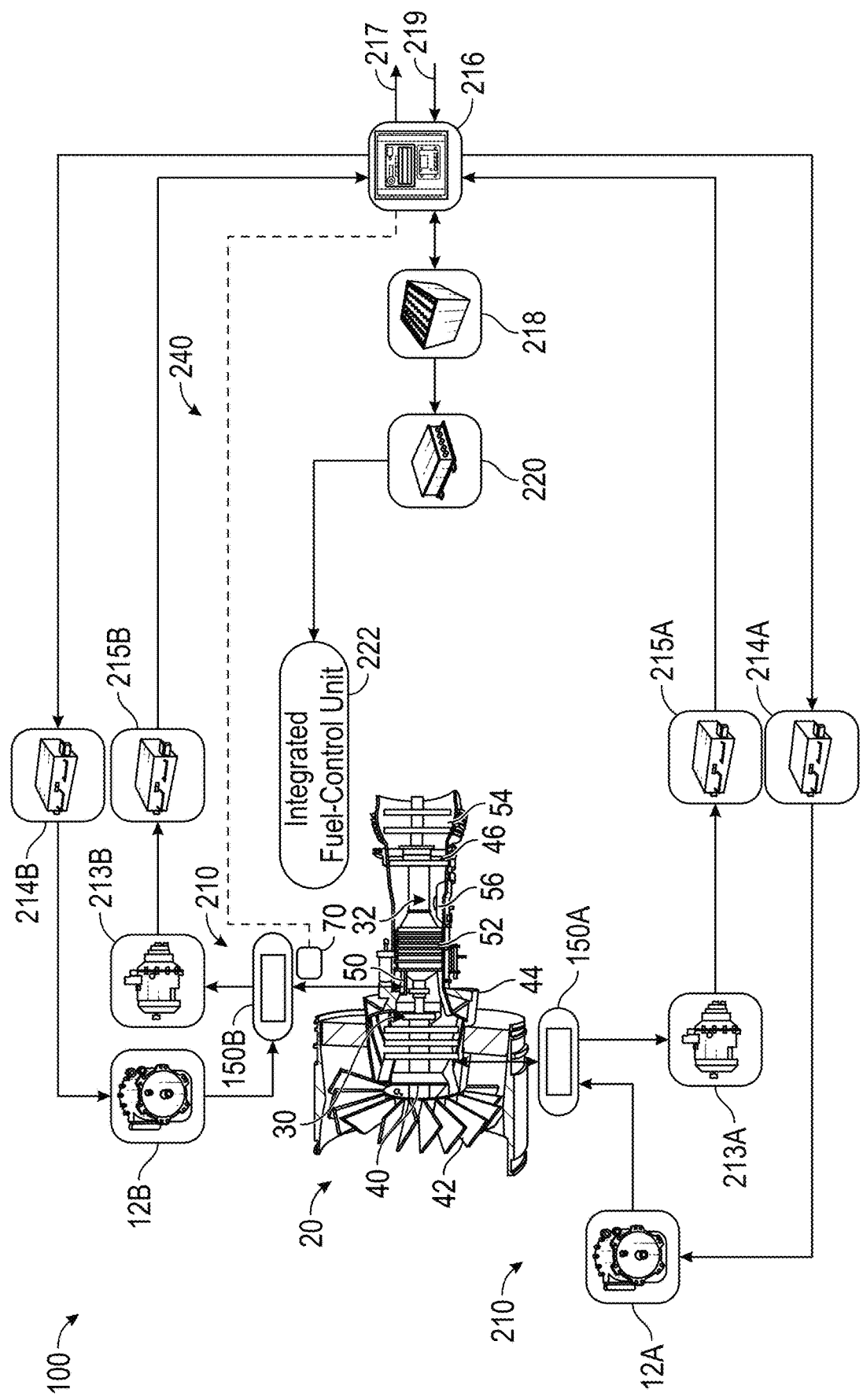
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100 or hybrid propulsion system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as hybrid aircraft 10 of FIG. 1. One or more mechanical power transmissions 150 (e.g., 150A, 150B) can be operably coupled between the gas turbine engine 20 (e.g., first gas turbine engine 20A, second gas turbine engine 20B) and the electrical power system 210. The gas turbine engine 20 includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50). The electrical power system 210 can include a low spool electric machine 12A configured to augment rotational power of the low speed spool 30 and a high spool electric machine 12B configured to augment rotational power of the high speed spool 32. The low spool electric machine 12A can control thrust by driving rotation of the fan 42, and the high spool electric machine 12B can act as a motor in driving rotation of the high speed spool 32.

Although two electric machines 12A, 12B are depicted in FIG. 2, it will be understood that there may be only a single electric machine (e.g., only high spool electric machine 12B) or additional motors (not depicted). Further, the electric machines 12A, 12B can be electric motors/generators or alternate power sources may be used, such as hydraulic motors, pneumatic motors, and other such types of motors known in the art. In some embodiments, the electrical power system 210 can include a low spool generator 213A configured to convert rotational power of the low speed spool 30 to electric power and/or a high spool generator 213B configured to convert rotational power of the high speed spool 32 to electric power. For example, where the low spool electric machine 12A is implemented as an electric motor, the low spool generator 213A can be a separate component, and/or where the high spool electric machine 12B is implemented as an electric motor, the high spool generator 213B can be a separate component. The combination of low spool electric machine 12A and low spool generator 213A can be collectively referred to as an electric machine or a motor-generator, and similarly, the combination of high spool electric machine 12B and high spool generator 213B can be collectively referred to as an electric machine or a motor-generator. Further, although two electric generators 213A, 213B (generally referred to as generators 213) are depicted in FIG. 2, it will be understood that there may be only a single electric generator (e.g., only electric generator 213B) or additional electric generators (not depicted). In some embodiments, one or more of the electric machines 12A, 12B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the low spool electric machine 12A and low spool generator 213A. The mechanical power transmission 150B can include a gearbox operably coupled between the outer shaft 50 and a combination of the high spool electric machine 12B and high spool generator 213B. In embodiments where the electric machines 12A, 12B are configurable between a motor and generator operating mode, the mechanical power transmission 150A, 150B can include a clutch or other interfacing element(s).

The electrical power system 210 can also include electric machine drive electronics 214A, 214B operable to condition current to/from the electric machines 12A, 12B. The electrical power system 210 can also include rectifier electronics 215A, 215B operable to condition current from the electric generators 213A, 213B (e.g., AC-to-DC converters). The electric machine drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a supercapacitor, an ultracapacitor, and the like. The energy storage management system 216 can facilitate various power transfers within the hybrid electric propulsion system 100. The energy storage management system 216 may also transfer power to/from one or more electric machines on the engine, or to external loads 217 and receive power from one or more external power sources 219 (e.g., power source 16 of FIG. 1, aircraft power, auxiliary power unit power, supplemental power unit, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high speed spool 32 and/or the high spool electric machine 12B. Alternatively, accessories 70 can be electrically driven through power provided by the energy storage management system 216 or other such sources of electrical power.

Engagement and operation of the low spool electric machine 12A, low spool generator 213A, high spool electric machine 12B, and high spool generator 213B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the electric machines 12A, 12B, electric generators 213A, 213B, integrated fuel control unit 222, and/or other elements (not depicted).

Figure 3:
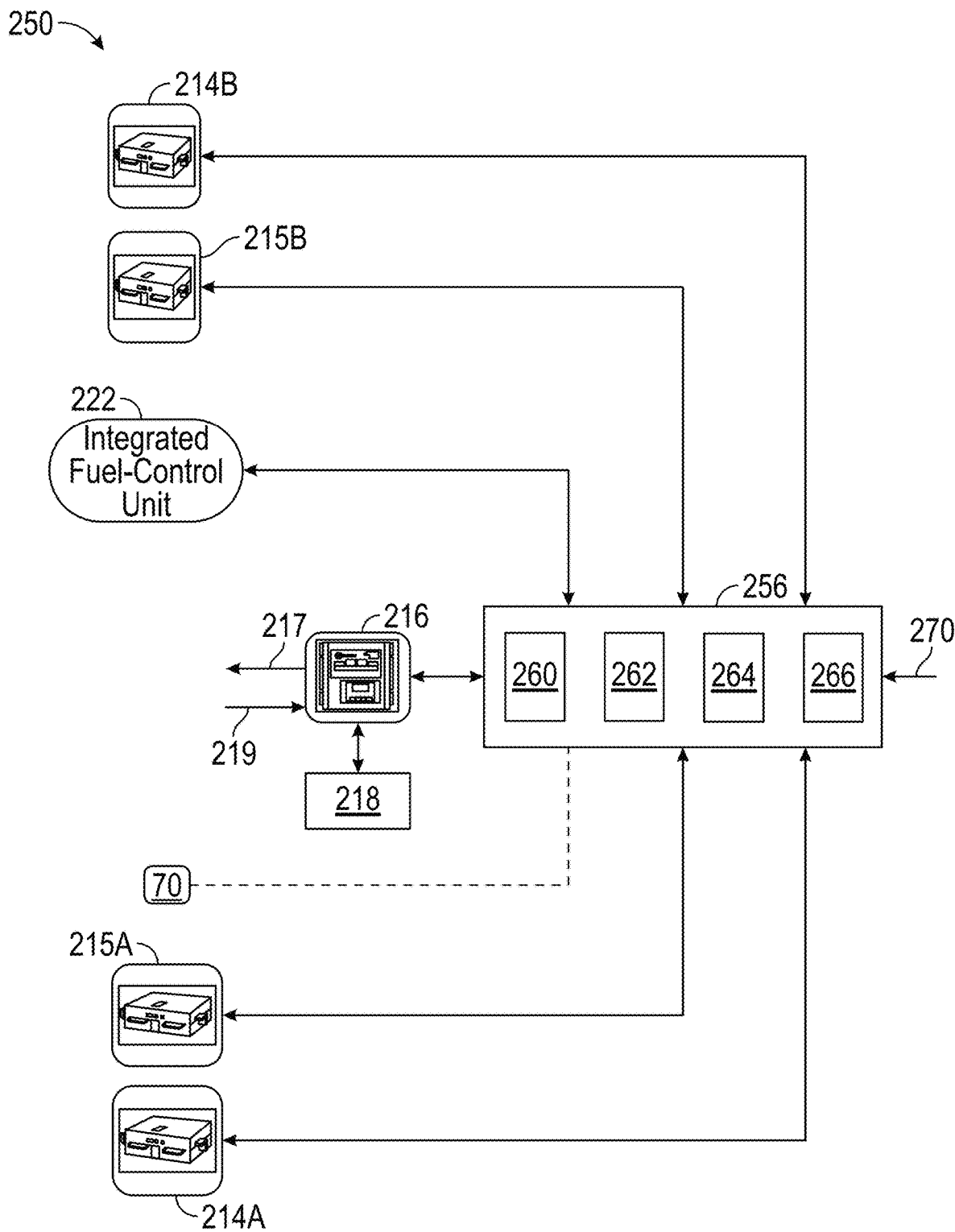
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the electric machine drive electronics 214A, 214B, rectifier electronics 215A, 215B, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the hybrid aircraft 10 of FIG. 1. In embodiments, the controller 256 can include a processing system 260, a memory system 262, and an input/output interface 264. The controller 256 can also include various operational controls, such as a hybrid engine control 266 that controls the hybrid electric system control effectors 240 further described herein, for instance, based on a thrust command 270. The thrust command 270 can be a throttle lever angle or a command derived based on a throttle lever angle control of the hybrid aircraft 10 of FIG. 1.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the electric machine drive electronics 214A, 214B, rectifier electronics 215A, 215B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

The controller 256 with hybrid engine control 266 can apply control laws and access/update models to determine how to control and transfer power between the low speed spool 30 and high speed spool 32, as well as power transfers between multiple gas turbine engines 20. For example, sensed and/or derived parameters related to speed, flow rate, pressure ratios, temperature, thrust, and the like can be used to establish operational schedules and transition limits to maintain efficient operation of the gas turbine engine 20, as well as for the hybrid aircraft 10 collectively. For instance, an operating mode of the gas turbine engine 20, such as idle, takeoff, climb, cruise, and descent can have different power settings, thrust requirements, flow requirements, and temperature effects. With respect to the hybrid aircraft 10 of FIG. 1, each of the gas turbine engines 20A, 20B can have different settings and splits between electric and fuel-burn based operations in one or more of the operating modes. The hybrid engine control 266 can control electric current provided to the low spool electric machine 12A and high spool electric machine 12B in a motor mode and loading effects of the low spool electric machine 12A and high spool electric machine 12B in a generator mode. The hybrid engine control 266 can also determine a power split between delivering fuel to the combustor 56 and using the low spool electric machine 12A and/or high spool electric machine 12B to power rotation within the gas turbine engine 20.

In embodiments, the controller 256 can blend the power distribution between the hybrid electric system control effectors 240 and fuel burn in the combustor 56. From a pilot's perspective, the setting of a throttle lever angle produces thrust command 270 without the pilot having to distinguish between whether motor-based thrust or fuel burn based thrust is needed, although the pilot may control whether fuel is on or off. With respect to the hybrid aircraft 10, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low spool electric machine 12A and/or the high spool electric machine 12B. Such a mixed operating mode may be used, for instance, during descent of the hybrid aircraft 10, where thrust is desired from both gas turbine engines 20A, 20B, but only one of the gas turbine engines 20A, 20B actively burns fuel.

In embodiments, the controller 256 can perform thrust balancing between a first gas turbine engine 20A of the first hybrid electric propulsion system 100A and a second gas turbine engine 20B of the second hybrid electric propulsion system 100B prior to activation of single engine descent mode and after activation of single engine descent mode. During descent of the hybrid aircraft 10 of FIG. 1, both gas turbine engines 20A, 20B may combust fuel to maintain a desired airspeed. As thrust demand is reduced for the hybrid aircraft 10, one of the gas turbine engines 20A, 20B may have a sufficient capacity to produce thrust without the other gas turbine engine 20A, 20B producing thrust. However, operating only one of the gas turbine engines 20A, 20B through combusting fuel can result in an imbalance and could result in performance issues if the fuel combusting engine experiences a fault while the depowered engine takes time to get up to speed for relighting. Embodiments can operate the fuel burning engine with an operating margin to extract power and provide electric power to either or both of the low spool electric machine 12A and the high spool electric machine 12B of the gas turbine engine 20 not combusting fuel such that the resulting thrust from being electrically driven substantially balances the thrust produced by the gas turbine engine 20 that is fuel driven. Supplemental electrical power can be provided from the energy storage system 218 and/or one or more external power sources 219 as needed.

The controller 256 can select and balance power extraction from the high speed spool 32, low speed spool 30, energy storage system 218, and/or external power sources 219 to power either or both of the low spool electric machine 12A and the high spool electric machine 12B of the gas turbine engine 20 being electrically driven. To provide electrical power from the gas turbine engine 20 being fuel-driven, fuel flow to the gas turbine engine 20 may increase to accommodate the loading of the low spool electric machine 12A and/or the high spool electric machine 12B operating in a generator mode. As one example, the high spool electric machine 12B of the gas turbine engine 20 being fuel-driven may be initially used as the primary source of electrical power as the gas turbine engine 20 is driven above idle during descent. If the speed of the fan 42 of the gas turbine engine 20 being fuel-driven results in excess thrust, the low spool electric machine 12A of the gas turbine engine 20 being fuel-driven can be used to extract power and add loading. The controller 256 can be configured as a dynamic multi-variable control that determines power distribution based on thrust and/or speed of the fan 42 (N1) to maintain minimum fuel flow and airflow requirements and provide electrical power for the gas turbine engine 20 being electrically driven. The electrical power can be distributed between the low spool electric machine 12A and/or the high spool electric machine 12B of the gas turbine engine 20 being electrically driven. For example, the high spool electric machine 12B of the gas turbine engine 20 being electrically driven may be the primary motor to maintain relight conditions for rapid restarting. The low spool electric machine 12A of the gas turbine engine 20 being electrically driven can be directly driven to make more rapid thrust adjustments. Control loops can balance electrical production by the gas turbine engine 20 being fuel driven with electrical demand by the gas turbine engine 20 being electrically driven and electrical power available from the energy storage system 218 and/or external power sources 219.

Referring now to FIG. 4 with continued reference to FIGS. 1-3, FIG. 4 is a flow chart illustrating a method 400 for providing hybrid electric single engine descent power extraction control, in accordance with an embodiment. The method 400 may be performed, for example, by the hybrid aircraft 10 through the hybrid electric propulsion systems 100A, 100B of FIG. 1. For purposes of explanation, the method 400 is described primarily with respect to the hybrid electric propulsion system 100 of FIG. 2: however, it will be understood that the method 400 can be performed on other configurations (not depicted).

Method 400 pertains to the controller 256 executing embedded code for power extraction, transfer, and thrust control using hybrid engine control 266 along with other control functions, where the controller 256 can be an aircraft-level control or distributed between aircraft and engine system levels of control. At block 402, the controller 256 can determine an operating mode of the hybrid aircraft 10 including a first gas turbine engine 20A of hybrid electric propulsion system 100A and a second gas turbine engine 20B of hybrid electric propulsion systems 100B, where the first gas turbine engine 20A includes a first low spool electric machine 12A and a first high spool electric machine 12B, and the second gas turbine engine 20B includes a second low spool electric machine 12A and a second high spool electric machine 12B. The controller 256 can receive a thrust command 270 for each gas turbine engine 20A, 20B, where each gas turbine engine 20A, 20B includes a low speed spool 30, a high speed spool 32, and a combustor 56. The thrust command 270 can be different between the first and second gas turbine engines 20A, 20B, or the thrust command 270 can be the same for both the first and second gas turbine engines 20A, 20B.

At block 404, the controller 256 can control power extraction from either or both of the first low spool electric machine 12A and the first high spool electric machine 12B of the first gas turbine engine 20A while a single engine descent mode is active. The controller 256 can be configured to apply a higher weighting on extracting power from the first high spool electric machine 12B than from the first low spool electric machine 12A to balance power extraction with thrust or speed of the first gas turbine engine 20A. Further, the controller 256 can be configured to apply a higher weighting on extracting power from the first low spool electric machine 12A to lower a thrust output of the first gas turbine engine 20A.

While single engine descent mode is active, fuel combustion can be commanded as a complete shut off of fuel flow to prevent fuel burn depending upon an operating state of the second gas turbine engine 20B. The first gas turbine engine 20A of hybrid electric propulsion system 100A can combust fuel, and fuel combustion can be inhibited in the second gas turbine engine 20B of hybrid electric propulsion system 100B for at least a portion of the time while the single engine descent mode is active. For example, the controller 256 can output a command of no fuel, fuel flow off, and/or otherwise effectively disable or reduce fuel flow as targeted. The operating state can depend on a combination of commands, conditions, and modes, such as an e-taxi mode, a starting mode, a ground idle mode, a takeoff mode, a climb mode, a cruise mode, an in-flight idle mode, a descent mode, a landing mode, and other such modes. The controller 256 can determine an allocation of the thrust command 270 between commanding fuel flow to the combustor 56 and electric current to the low spool electric machine 12A and/or high spool electric machine 12B based on the operating state of the first and second gas turbine engines 20A, 20B and a throttle lever angle, where the throttle lever angle can be received from a pilot control, an auto-pilot control, or other such source on the hybrid aircraft 10. In a motor mode, the low spool electric machine 12A and/or the high spool electric machine 12B can be powered by one or more of a generator, an energy storage system 218, and a power source 16 external to the gas turbine engine 20. The single engine descent mode can be active based on determining that the first gas turbine engine 20A has a thrust generation capacity to maintain a targeted airspeed during descent of the hybrid aircraft 10 in combination with providing electric power to either or both of the second low spool electric machine 12A and the second high spool electric machine 12B of the second gas turbine engine 20B The power source 16 can include an energy storage system. The controller 256 can be operable to provide at least a portion of the power extracted from either or both of the first low spool electric machine 12A and the first high spool electric machine 12B to the energy storage system 218. The controller 256 can be operable to power either or both of the second low spool electric machine 12A and the second high spool electric machine 12B at least in part by one or more of the energy storage system 218 and/or another power source external to the second gas turbine engine 20B (e.g., external power source 219).

At block 406, the controller 256 can provide electric power to either or both of the second low spool electric machine 12A and the second high spool electric machine 12B while the single engine descent mode is active to balance thrust between the first gas turbine engine 20A and the second gas turbine engine 20B.

The controller 256 can control a high spool electric machine 12B to accelerate the high speed spool 32 and augment rotational power of the high speed spool 32, while the low spool electric machine 12A can control thrust produced by the low speed spool 30. The controller 256 can be configured to apply a higher power input weighting to the second high spool electric machine 12B than to the second low spool electric machine 12A to maintain relight readiness of the second gas turbine engine 20B.

Power source selection can depend on the available power and allocation of power between systems of the hybrid aircraft 10. For instance, using electric power from one of the gas turbine engines 20 burning fuel can allow that engine to operate at a higher thermal efficiency by using a higher power setting. A greater amount of battery power or other stored energy from the energy storage system 218 may be available after a recharge event. Some embodiments can support recharging during operation of the hybrid aircraft 10, such as during cruise.

A designation of the first gas turbine engine 20A and the second gas turbine engine 20B can be changed between flights of the hybrid aircraft 10 to alternate which engine is burning fuel when single engine descent mode is active while the other operates on electric power. The designation needed not change for each flight and may be based on various selection criteria, such as deterioration, in order to optimize fleet management.

Embodiments of the invention can provide a number of advantages and benefits. For instance, compared to conventional descent, fuel burn can be reduced. Using the energy storage system 218 with recharging during cruise can support the use of stored energy collected nearer to cruise efficiency to power descent. Driving rotation of the fan 42 of both gas turbine engines 20A, 20B can reduce a yawing moment and improve aerodynamics of the hybrid aircraft 10 during descent as compared to fully shutting down one of the gas turbine engines 20A, 20B. This can also improve engine thermal efficiency of the gas turbine engine 20 that is fuel-driven by continuing to burn fuel with higher power operation and improve engine restarting by keeping components of the electrically-driven gas turbine engine 20 rotating. Further, one or more accessories 70 of the first gas turbine engine 20A and one or more accessories 70 of the second gas turbine engine 20B can be powered while the single engine descent mode is active.

While the above description has described the flow process of FIG. 4 in a particular order, it should be appreciated that unless otherwise specifically required in the attached claims that the ordering of the steps may be varied. Also, it is clear to one of ordinary skill in the art that, the asymmetric hybrid aircraft idle described herein can be combined with aircraft and propulsion system control features, such as fuel flow control, power management, emergency operation, and the like.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a hybrid aircraft, the system comprising:
a first gas turbine engine comprising a first fan, a first low spool electric machine, and a first high spool electric machine;
a second gas turbine engine comprising a second fan, a second low spool electric machine, and a second high spool electric machine; and
a controller operable to:
determine an operating mode of the hybrid aircraft;
control power extraction from the first low spool electric machine and the first high spool electric machine while a single engine descent mode is active, wherein power extraction from the first high spool electric machine is initially used as a primary source of electric power while the first gas turbine engine is driven above idle during descent of the hybrid aircraft, and power is extracted from the first low spool electric machine based on determining that a speed of the first fan results in excess thrust; and
provide electric power to either or both of the second low spool electric machine and the second high spool electric machine while the single engine descent mode is active to balance thrust between the first gas turbine engine and the second gas turbine engine, wherein electric power provided to the second low spool electric machine drives rotation of the second fan to balance thrust between the first gas turbine engine and the second gas turbine engine.

2. The system of claim 1, wherein the first gas turbine engine combusts fuel, and fuel combustion is inhibited in the second gas turbine engine while the single engine descent mode is active.

3. The system of claim 1, wherein the single engine descent mode is active based on determining that the first gas turbine engine has a thrust generation capacity to maintain a targeted airspeed during descent of the hybrid aircraft in combination with providing electric power to either or both of the second low spool electric machine and the second high spool electric machine.

4. The system of claim 1, wherein the controller is configured to apply a higher weighting on extracting power from the first high spool electric machine than from the first low spool electric machine to balance power extraction with thrust or speed of the first gas turbine engine.

5. The system of claim 4, wherein the controller is configured to apply a higher weighting on extracting power from the first low spool electric machine to lower a thrust output of the first gas turbine engine.

6. The system of claim 1, further comprising:
an energy storage system; and
wherein the controller is operable to provide at least a portion of the power extracted from either or both of the first low spool electric machine and the first high spool electric machine to the energy storage system.

7. The system of claim 6, wherein the controller is operable to power either or both of the second low spool electric machine and the second high spool electric machine at least in part by one or more of the energy storage system and a power source external to the second gas turbine engine.

8. The system of claim 1, wherein the controller is configured to apply a higher power input weighting to the second high spool electric machine than to the second low spool electric machine to maintain relight readiness of the second gas turbine engine.

9. The system of claim 1, wherein one or more accessories of the first gas turbine engine and one or more accessories of the second gas turbine engine are powered while the single engine descent mode is active.

10. The system of claim 1, wherein the controller is operable to change a designation of the first gas turbine engine and the second gas turbine engine between flights of the hybrid aircraft.

11. A method comprising:
determining an operating mode of a hybrid aircraft comprising a first gas turbine engine and a second gas turbine engine, wherein the first gas turbine engine comprises a first fan, a first low spool electric machine and, a first high spool electric machine, and the second gas turbine engine comprises a second fan, a second low spool electric machine, and a second high spool electric machine;
controlling power extraction from the first low spool electric machine and the first high spool electric machine while a single engine descent mode is active, wherein power extraction from the first high spool electric machine is initially used as a primary source of electric power while the first gas turbine engine is driven above idle during descent of the hybrid aircraft, and power is extracted from the first low spool electric machine based on determining that a speed of the first fan results in excess thrust; and
providing electric power to either or both of the second low spool electric machine and the second high spool electric machine while the single engine descent mode is active to balance thrust between the first gas turbine engine and the second gas turbine engine, wherein electric power provided to the second low spool electric machine drives rotation of the second fan to balance thrust between the first gas turbine engine and the second gas turbine engine.

12. The method of claim 11, further comprising:
combusting fuel by the first gas turbine engine; and
inhibiting fuel combustion in the second gas turbine engine while the single engine descent mode is active.

13. The method of claim 11, wherein the single engine descent mode is active based on determining that the first gas turbine engine has a thrust generation capacity to maintain a targeted airspeed during descent of the hybrid aircraft in combination with providing electric power to either or both of the second low spool electric machine and the second high spool electric machine.

14. The method of claim 11, further comprising:
applying a higher weighting on extracting power from the first high spool electric machine than from the first low spool electric machine to balance power extraction with thrust or speed of the first gas turbine engine.

15. The method of claim 14, further comprising:
applying a higher weighting on extracting power from the first low spool electric machine to lower a thrust output of the first gas turbine engine.

16. The method of claim 11, further comprising:
providing at least a portion of the power extracted from either or both of the first low spool electric machine and the first high spool electric machine to an energy storage system.

17. The method of claim 16, further comprising:
powering either or both of the second low spool electric machine and the second high spool electric machine at least in part by one or more of the energy storage system and a power source external to the second gas turbine engine.

18. The method of claim 11, further comprising:
applying a higher power input weighting to the second high spool electric machine than to the second low spool electric machine to maintain relight readiness of the second gas turbine engine.

19. The method of claim 11, further comprising:
powering one or more accessories of the first gas turbine engine and one or more accessories of the second gas turbine engine while the single engine descent mode is active.

20. The method of claim 11, further comprising:
changing a designation of the first gas turbine engine and the second gas turbine engine between flights of the hybrid aircraft.

\* \* \* \* \*